United States Patent [19]
Kanarek

[11] 3,863,790
[45] Feb. 4, 1975

[54] WRAPPER REMOVAL APPARATUS

[76] Inventor: Joseph S. Kanarek, 5435 W. 63rd St., Chicago, Ill. 60638

[22] Filed: Apr. 20, 1973

[21] Appl. No.: 352,897

[52] U.S. Cl.................. 214/305, 209/115, 214/309
[51] Int. Cl............................................. B65g 65/04
[58] Field of Search ........... 214/304, 305, 311, 309; 259/175, 176; 209/115; 198/102, 165

[56] References Cited
UNITED STATES PATENTS

| | | | |
|---|---|---|---|
| 1,858,320 | 5/1932 | Beardsley et al. | 198/165 |
| 2,729,885 | 1/1956 | Wahl et al. | 214/305 |
| 2,875,907 | 3/1959 | Locke et al. | 214/6 P |
| 3,328,006 | 6/1967 | Buelow et al. | 259/175 |
| 3,386,320 | 6/1968 | Pinkham et al. | 214/305 |
| 3,531,002 | 9/1970 | Lemelson | 214/16.4 A |
| 3,612,271 | 10/1971 | Behling | 209/115 |
| 3,693,320 | 9/1972 | Garland | 209/115 |

Primary Examiner—Robert J. Spar
Assistant Examiner—Lawrence J. Oresky
Attorney, Agent, or Firm—Wallenstein, Spangenberg, Hattis & Strampel

[57] ABSTRACT

Apparatus for, and method of, separating a solid article such as a soap bar, candy bar, or the like, from its wrapper. The apparatus includes a first wrapper slitting station where a pair of cutting blades slit the wrapper on opposite sides along one dimension of the solid article. The wrappers are then moved to a second wrapper slitting station where a pair of cutting blades slit the wrapper on opposite sides along another dimension of the solid article. The slit wrapper thereafter is separated from the solid article, and the solid article is recovered free of contaminating fragments or pieces of the wrapper.

6 Claims, 5 Drawing Figures

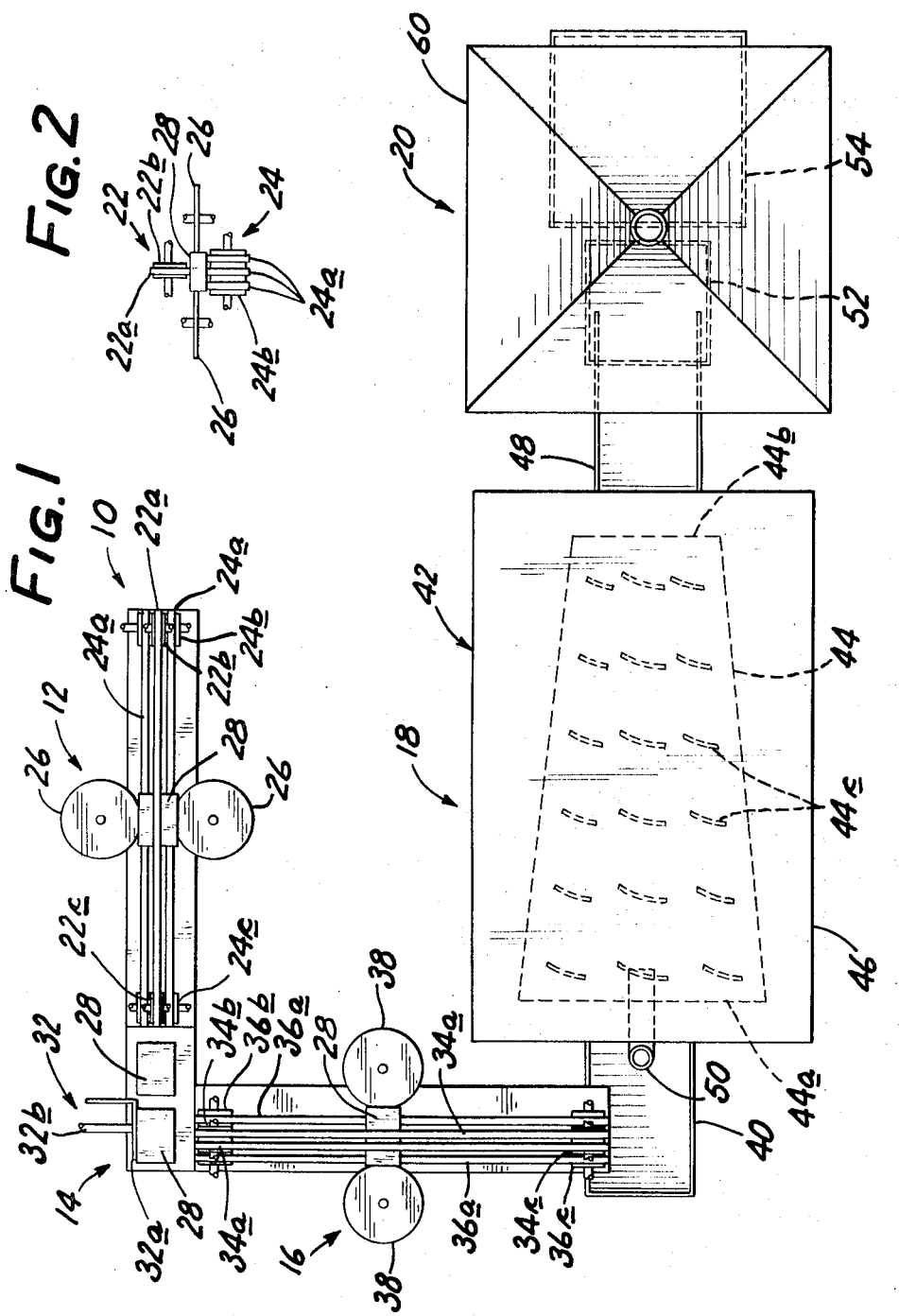

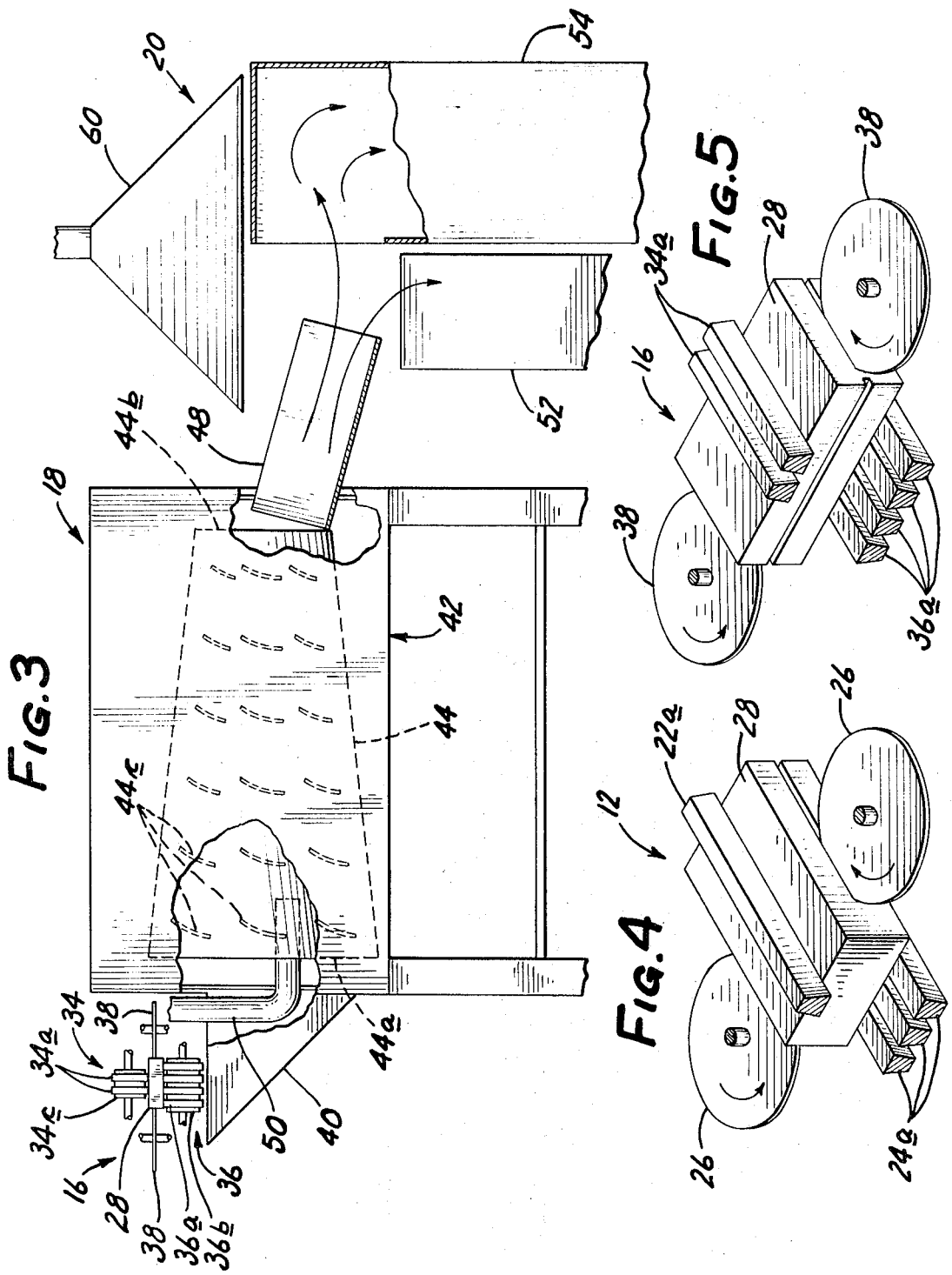

WRAPPER REMOVAL APPARATUS

The present invention relates to apparatus for, and a method of, separating a solid article from its wrapper whereby the solid article can be recovered free of contaminating fragments or pieces of the wrapper.

The recovery, or salvaging, of solid articles such as soap bars, candy bars, and various other products sold in bar form, which, for one reason or another, are themselves defective, or have been improperly wrapped, is an important economic consideration to manufacturers of such articles. Heretofore, the removal of the wrappers from bar-type products has, in the main, been carried out manually.

In accordance with the present invention, apparatus is provided for rapidly, effectively and economically separating solid articles in bar, or the like, form from their wrappers. The apparatus can be operated at various speeds to enable the processing of an optimum number of articles per unit time, and can be adjusted to enable the processing of articles of different sizes. The apparatus achieves the complete removal of the wrappers from the solid articles without contaminating the recovered articles with pieces or fragments of the separated wrappers.

The apparatus of this invention, in brief, comprises a wrapped article receiving station, a first wrapper slitting station, a wrapped article orienting station, a second wrapper slitting station, and a wrapper removal and article recovery station. In the illustrative embodiment of the invention described hereinafter in detail, the receiving station comprises vertically spaced upper and lower conveyors for engaging a wrapped article and moving it to the first wrapper slitting station while maintaining the wrapped article in a properly oriented position. The first slitting station includes a pair of cutting blades which act to slit the wrapper on the article on opposite sides along one dimension of the wrapped article. The wrapped article is then moved to the orienting station where it is moved at an angle to its initial path of travel into engagement with vertically spaced upper and lower conveyors. These conveyors, like the first mentioned conveyors, engage the still wrapped article and move it to the second wrapper slitting station while maintaining the wrapped article in a properly oriented position. The second slitting station, like the first, includes a pair of cutting blades which act to slit the wrapper on opposite sides along the other dimension of the wrapped article. The wrapper, after moving through the second slitting station, has a continuous slit along the entire periphery of the article. The article, with the slit wrapper thereon, is passed to the wrapper removal and article recovery station. At this station, the article is tumbled while advantageously being simultaneously subjected to a forced air stream, or a vacuum, or both an air stream and a vacuum. The combined action of the tumbler and the air stream, or vacuum, or both an air stream and a vacuum, separates the slit wrapper completely from the article, and the article is recovered free of any contaminating fragments or pieces of the wrapper. The entire operation requires only seconds to complete, and can be carried out with minimum operating personnel.

Other objects, advantages and features of the invention will become apparent upon making reference to the specification to follow, the claims and the drawings wherein:

FIG. 1 is a top plan view of an embodiment of the wrapper removing and article recovery apparatus of the present invention;

FIG. 2 is an end view of the apparatus as viewed from the wrapped article receiving station;

FIG. 3 is a fragmentary side view in elevation of the wrapper removal and article recovery station of said embodiment of the invention with portions thereof broken away and in section;

FIG. 4 is a view in perspective, partly in section, of the first wrapper slitting station of said embodiment of the apparatus; and FIG. 5 is a view in perspective, partly in section, of the second wrapper slitting station of said embodiment of the apparatus.

The embodiment of the apparatus illustrated in FIG. 1 comprises a wrapped article receiving station 10, a first wrapper slitting station 12, a wrapped article orienting station 14, a second wrapper slitting station 16, a wrapper removal station 18, and an article recovery station 20. The arrangement of the various stations, as shown, facilitates movement of wrapped solid articles through the apparatus while at the same time utilizing minimal space. The arrangement, in addition, enables operating personnel to readily and easily observe the articles as they proceed from station to station.

Station 10 includes vertically spaced apart upper and lower conveyors 22 and 24, respectively. The length of the conveyors 22 and 24 advantageously is such that they extend from station 10 of the apparatus, through station 12, to station 14. The upper conveyor 22, as shown, comprises an endless belt 22a mounted for rotation on a front pulley 22b and a rear pully 22c. The lower conveyor 24 comprises a plurality of parallely arranged endless belts 24a mounted for rotation on a front pulley 24b and a rear pulley 24c. The front pulleys 22b and 24b and the rear pulleys 22c and 24c advantageously can be adjusted vertically to accommodate wrapped articles of different sizes. While the belts 22a and 24a are illustrated as V-belts, they may, of course, be in the form of continuous web belts of suitable width.

Station 12 of the apparatus comprises a pair of circular, continuously rotating cutting blades 26—26. The blades 26—26 are positioned on opposite sides of the conveyors 22 and 24, and are spaced apart a distance such that they will slit, sever or cut completely through a wrapper on an article 28, conveyed therebetween by the conveyors 22 and 24, along one dimension of the article. The cutting blades 26—26 advantageously can be adjusted in a vertical as well as a horizontal plane to effect slitting of wrapped articles of different sizes. The periphery of the blades 26—26, when they are cutting a wrapper, desirably moves in the direction of travel of the article to enhance the cutting action of the blades.

Station 14 of the apparatus includes a support surface 30 for receiving the articles 28 after they have passed through station 12. Positioned adjacent the surface 30 is a reciprocating article engaging member 32 which, in the embodiment of the invention illustrated, comprises an air or hydraulic cylinder (not shown) having a pusher head 32a joined to a push rod 32b. The head 32a has a stop plate 32c joined along one margin thereof to prevent articles from getting behind the head 32a while the head 32a is in a forward position.

The member 32 acts both to change the direction of travel of the articles 28 as they are discharged by the conveyors 22 and 24, and to position and orient each article between vertically spaced, upper and lower conveyors 34 and 36, respectively. The conveyors 34 and 36, as shown, are of sufficient length to carry each article through the second wrapper slitting station 16 to the wrapper removal station 18. The upper conveyor 34 comprises a pair of parallely arranged continuous belts 34a mounted for rotation on a front pulley 34b and a rear pulley 34c. The lower conveyor 36 also comprises a plurality of parallely arranged continuous belts 36a mounted for rotation on a front pulley 36b and a rear pulley 36c. As in the case of the belts 22a and 24a of the pulleys 22 and 24, the belts 34a and 36a, while illustrated as V-belts, may be in the form of continuous web belts of desired width. Also, as in the case of the conveyors 22 and 24, the front pulleys 34b and 36b, and the rear pulleys 34c and 36c thereof advantageously are vertically adjustable.

The wrapper slitting station 16 which is associated with the conveyors 34 and 36, like wrapper slitting station 12, comprises a pair of circular, continuously rotating cutting blades 38—38. The blades 38—38, as in the case of the blades 26—26 of station 12, are positioned on opposite sides of the conveyors 34 and 36, and are spaced apart a distance such that they will slit, sever or cut completely through the wrapper on the article 28, conveyed therebetween by the conveyors 34 and 36, along the other dimension of the article. The cutting blades 38—38 advantageously are adjustable in a vertical as well as in a horizontal plane to enable them to slit wrapped articles of different sizes, and, like the blades 26—26, the periphery of the blades 38—38, during cutting, moves in the direction of travel of the article to enhance the cutting action of the blades.

The conveyors 34 and 36 transport the still wrapped articles 28 to the wrapper removal station 18 of the apparatus. The station 18 comprises a receiving hopper 40 joined to a tumbler 42 having a frusto-conically shaped basket 44 journaled for rotation about its longitudinal axis in the tumbler housing 46. The basket 44 has an inlet 44a, which communicates with the hopper 40, and an outlet 44b, which communicates with a discharge chute 48. Internally, the basket 44 has a plurality of spaced, circumferentially and longitudinally staggered, inwardly extending directional vanes 44c joined to the inner surface thereof. This arrangement enables a continuous flow to be maintained through the basket 44 to the discharge chute 48. Extending into the basket, through the inlet 44a thereof, is a conduit 50 for passing air under pressure into the interior of the basket 44. The pressurized air from the conduit 50, coupled with the tumbling action of the basket 44, serves effectively to completely remove the slit wrappers from the articles 28 as they move through the basket 44 toward the discharge chute 48.

In the embodiment of the apparatus illustrated, the wrapper removal station 18 is associated, at its outlet end, with an article collecting container or bin 52 for the wrapper-free articles, and a slit wrapper collecting container or bin 54 for the sections or fragments of the slit wrappers removed from the articles. The wrapper-free articles fall from the chute 48 into the bin 52 under their own weight. As shown in FIGS. 1 and 3 of the drawing, a vacuum hood 60 desirably is positioned over the chute 48, and the bins 52 and 54 to create a zone of reduced pressure thereabove. The combined action of the pressurized air flowing from the outlet 44b of the basket 44, and the vacuum established under the hood 60 enables the fragments or sections of the lighter, slit wrappers to pass over the bin 52 and to be collected in the bin 54. The hood 60, if desired, can be reduced in size and located over the chute 48, only, and the slit wrappers can be conveyed by a conduit connected to the hood to a point remote from the station 18.

While actuation of the conveyors, the cutting blades and the tumbler basket can be achieved in various ways which will be apparent to those skilled in the art, in the embodiment of the apparatus illustrated, the conveyors 22 and 24, and the conveyors 34 and 36, are driven by separate motors, not shown, which are connected to the rear pulleys 22c and 24c, and 34c and 36c, respectively. The pulleys are geared in a manner to cause the continuous belts to rotate at the same speed. The cutting blades in the apparatus described are each operated by a separate motor, not shown, as is the tumbler basket.

In operation, wrapped articles 28, are fed, at station 10, either mechanically or manually, between the continuous belts of the conveyors 22 and 24. The articles as they are fed into the conveyors, are oriented to align either the longitudinal, or the transverse, axis of each article with the path of its travel toward the first wrapper slitting station 12. As shown, the articles 28 are positioned with their longitudinal axis in alignment with their path of travel between the conveyors 22 and 24. At the station 12, the continuously moving articles pass between the oppositely rotating cutting blades 26—26 which slit the wrapper along one dimension of the articles. The articles, with the partly slit wrappers thereon, are then carried by the conveyors 22 and 24 to the article orienting station 14. The pusher head 32a of the reciprocating member 32, on the forward stroke of the push rod 32b, at the station 14, moves the articles into engagement with the belts 34a and 36a of the conveyors 34 and 36. The action of the reciprocating member 32 effects a right angle change in the direction of travel of the articles, and orients the articles to align the transverse axis thereof with the path of travel of the conveyor belts 34a and 36a. The conveyors 34 and 36 carry the articles to the second wrapper slitting station 16 where the oppositely rotating cutting blades 38—38 slit the wrapper along the other dimension of the articles. The slits made by the blades 38—38 are made at the same level as the slits made by the blades 26—26 and intersect them, thus providing a continuous slit through the wrapper around the entire periphery of each article. The articles, with the slit wrappers thereon, are then carried by the conveyors 34 and 36 to the hopper 40 which is associated with the wrapper removal station 18. The articles drop into the hopper 40 as they are released by the conveyors 34 and 36, and are guided into the open end 44a of the basket 44 by the downwardly inclined bottom wall of the hopper 40. In the basket 44, the articles simultaneously are subjected to a vigorous tumbling action and to a stream of air under pressure emanating from the outlet of the conduit 50. The directional vanes 44c on the inner wall of the basket 44 act to move the articles in the direction of the outlet end 44b of the basket. As the articles travel the length of the basket, the slit wrappers are completely removed from the articles. The wrapper-free articles, and the pieces or fragments of the slit wrappers, pass from the outlet end of the basket into the discharge chute 48. The wrapper-free articles slide, under their own weight into the article collecting bin 52, while the wrapper pieces or fragments, are drawn, by the effect of the vacuum under the hood 60, into the wrapper collecting bin 54. In this connection, it should be pointed out that the use of air under pressure to aid in the removal of the slit wrappers from the articles could be eliminated by creating a zone of reduced pressure under the vacuum hood 60 which is sufficient to cause the pieces or fragments of the wrappers to always pass over the bin 52 and be deposited in the bin 54, or, as indicated above, to cause the slit wrappers to be conveyed to a point remote from the station 18 by a conduit connected to the hood 60. The apparatus can be operated at any speed desired, depending upon the rate at which the wrapped articles are fed into the conveyors 22 and 24 at the station 10.

It should be understood that various modifications may be made in the illustrative embodiment of the invention above described without deviating from the broader aspects of the invention as set forth in the appended claims.

What is claimed is:

1. Apparatus for separating a solid article from its wrapper, said article having a thickness such that the wrapper can be slit along its sides, comprising: conveyor means for moving in one direction a wrapped solid article, having a thickness such that the wrapper can be slit along its sides, to a first wrapper slitting station, said conveyor means including vertically spaced apart members between which the wrapped article is engaged for movement to the wrapper slitting station, said members serving to support the wrapped article and to maintain it in a properly oriented position as it is conveyed in said one direction to the first wrapper slitting station, wrapper slitting means at said first station for slitting the wrapper on the article on opposite sides along one dimension of the article, conveyor means for moving the wrapped article in another direction to a second wrapper slitting station, said last mentioned conveyor means including vertically spaced apart members between which the wrapped article is engaged for movement to the second wrapper slitting station, said members serving to support the wrapped article and to maintain it in a properly oriented position as it is conveyed in said other direction to the second wrapper slitting station, wrapper slitting means at said second station for slitting the wrapper on said article on opposite sides along another dimension of said article, and wrapper separating means for removing the slit wrapper from the article, including tumbling means for mechanically removing the slit wrapper from the article, said tumbling means includes a rotatable open-ended basket having guide means arranged on the inner surface thereof for directing articles in the basket from the inlet end thereof to the outlet end thereof as the basket is rotated, said wrapper separating means further including means for producing a zone of reduced pressure for facilitating the recovery of the articles free from pieces or fragments of the slit wrapper.

2. Apparatus according to claim 1 wherein the conveyor means comprises vertically spaced conveyor belts between which the article is engaged for movement to the wrapper slitting stations.

3. Apparatus according to claim 1 wherein the wrapper slitting means comprises oppositely rotating cutting blades positioned on each side of the conveyor means.

4. Apparatus according to claim 1 wherein the wrapper separating means includes conduit means for directing a stream of air under pressure into the basket as the articles are being tumbled.

5. Apparatus according to claim 1 wherein the first mentioned conveyor means is arranged at substantially a right angle to the second mentioned conveyor means, and article orienting means are provided adjacent the angle-forming ends of the conveyors for changing the direction of the path of travel of articles released by the first mentioned conveyor means.

6. Apparatus according to claim 5 wherein the article orienting means comprises an air cylinder having a reciprocating pusher rod joined to a pusher head for engaging articles and changing the direction of the path of travel thereof.

* * * * *